(12) United States Patent
Jayapalan et al.

(10) Patent No.: US 9,241,014 B2
(45) Date of Patent: Jan. 19, 2016

(54) METHODS, SYSTEMS, AND COMPUTER-READABLE MEDIA FOR TRANSFERRING OR RECOVERING A COMMUNICATION BETWEEN A NUMBER OF PARTICIPANTS

(75) Inventors: Vijay Jayapalan, San Antonio, TX (US); Judd Woehrle, San Antonio, TX (US); Christopher S. Trost, San Antonio, TX (US); Matthew C. Reedy, Shavano Park, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 100 days.

(21) Appl. No.: 13/253,718

(22) Filed: Oct. 5, 2011

(65) Prior Publication Data

US 2012/0087234 A1    Apr. 12, 2012

Related U.S. Application Data

(60) Provisional application No. 61/392,299, filed on Oct. 12, 2010.

(51) Int. Cl.
| | |
|---|---|
| *H04L 29/06* | (2006.01) |
| *H04M 3/42* | (2006.01) |
| *H04Q 3/00* | (2006.01) |
| *H04L 29/14* | (2006.01) |
| *H04L 12/24* | (2006.01) |
| *H04L 29/08* | (2006.01) |

(52) U.S. Cl.
CPC ............ *H04L 65/1083* (2013.01); *H04L 65/80* (2013.01); *H04L 69/40* (2013.01); *H04M 3/42* (2013.01); *H04Q 3/0045* (2013.01); *H04L 41/0654* (2013.01); *H04L 41/5061* (2013.01); *H04L 67/142* (2013.01); *H04L 67/146* (2013.01); *H04M 2203/2038* (2013.01); *H04M 2203/2088* (2013.01)

(58) Field of Classification Search
CPC .................. H04M 2203/10; H04M 2203/2088
USPC ................. 370/216–218, 242–252, 351–356; 709/224–226; 379/220.01–221.05, 379/265.01–265.09, 265.1–265.14, 379/266.01–266.092, 266.1
See application file for complete search history.

(56) References Cited

U.S. PATENT DOCUMENTS

| | | | |
|---|---|---|---|
| 5,450,485 A | 9/1995 | Hamilton | |
| 5,696,809 A | 12/1997 | Voit | |
| 6,704,410 B1 * | 3/2004 | McFarlane et al. | 379/265.05 |
| 7,197,133 B2 * | 3/2007 | Cook et al. | 379/265.09 |
| 7,286,467 B1 | 10/2007 | Sylvain | |
| 7,688,804 B2 | 3/2010 | Peters | |

(Continued)

OTHER PUBLICATIONS

International Search Report and Written Opinion from related PCT application PCT/US2011/001752 dated May 24, 2012, 9 pages.

(Continued)

*Primary Examiner* — Habte Mered
(74) *Attorney, Agent, or Firm* — Fish & Richardson P.C.

(57) ABSTRACT

The present disclosure relates to methods, systems, and computer-readable media for conducting communications. One method includes determining a context associated with a communication between a first participant and a second participant while the communication is occurring, determining a failure of the communication, and resuming the communication based, at least in part, on the context.

35 Claims, 2 Drawing Sheets

(56) References Cited

U.S. PATENT DOCUMENTS

| | | |
|---|---|---|
| 7,953,016 B2 | 5/2011 | Baker |
| 8,265,248 B2 * | 9/2012 | Raghav et al. ............ 379/142.07 |
| 8,369,496 B2 * | 2/2013 | Deshpande et al. ....... 379/88.18 |
| 8,374,317 B2 * | 2/2013 | Jaiswal et al. ............. 379/88.04 |
| 8,582,750 B2 * | 11/2013 | Lee et al. ................. 379/265.02 |
| 8,599,682 B2 | 12/2013 | Ger |
| 8,634,534 B1 * | 1/2014 | Brandt et al. ............ 379/221.01 |
| 8,855,292 B1 * | 10/2014 | Brunson ................. 379/266.01 |
| 2003/0235287 A1 | 12/2003 | Margolis |
| 2005/0047579 A1 * | 3/2005 | Salame ................... 379/265.09 |
| 2007/0121596 A1 | 5/2007 | Kurapati et al. |
| 2007/0208858 A1 | 9/2007 | Ra et al. |
| 2008/0008305 A1 * | 1/2008 | Neuhaus ................. 379/211.02 |
| 2008/0037752 A1 * | 2/2008 | Chatilov et al. .......... 379/202.01 |
| 2008/0043981 A1 * | 2/2008 | Mohan .................... 379/265.02 |
| 2008/0075240 A1 | 3/2008 | Ramanathan et al. |
| 2008/0232575 A1 * | 9/2008 | Gumbula ................. 379/265.11 |
| 2008/0240080 A1 | 10/2008 | Patait |
| 2008/0240381 A1 * | 10/2008 | Acharya et al. ........... 379/88.14 |
| 2008/0305806 A1 * | 12/2008 | Jung et al. ................. 455/456.1 |
| 2009/0202056 A1 * | 8/2009 | Raghav et al. ........... 379/142.04 |
| 2009/0238359 A1 * | 9/2009 | Ely et al. .................. 379/265.02 |
| 2009/0257345 A1 | 10/2009 | King |
| 2010/0232589 A1 * | 9/2010 | Vernick .................... 379/216.01 |
| 2010/0246800 A1 | 9/2010 | Geppert et al. |
| 2010/0296645 A1 | 11/2010 | Dutta |
| 2010/0296646 A1 * | 11/2010 | Hemm et al. ............ 379/265.02 |
| 2011/0032821 A1 | 2/2011 | Morrill et al. |
| 2011/0044321 A1 | 2/2011 | Rosenberg et al. |
| 2011/0060754 A1 * | 3/2011 | Theimer et al. ............... 707/769 |
| 2011/0141879 A1 | 6/2011 | Ballard |
| 2012/0057683 A1 | 3/2012 | Liik et al. |
| 2012/0087234 A1 | 4/2012 | Jayapalan et al. |
| 2012/0328084 A1 | 12/2012 | Raghav et al. |

OTHER PUBLICATIONS

"Failover, load sharing and server architecture in SIP telephony" [Retreived on Feb. 24, 2011], Retrieved from Science Direct.com.

"Two Stage Architecture for Load Balancing and Failover in SIP Networks" [Retreived on Feb. 24, 2011], Retrieved from: http://www.idosi.org/mejsr/mejsr6(1)10/15.pdf.

* cited by examiner

METHODS, SYSTEMS, AND COMPUTER-READABLE MEDIA FOR TRANSFERRING OR RECOVERING A COMMUNICATION BETWEEN A NUMBER OF PARTICIPANTS

TECHNICAL FIELD

The present disclosure relates to methods, systems, and computer-readable media for conducting communications.

BACKGROUND

Communications (e.g., voice signaling and/or media, among other communications) in an IP-based voice network (e.g., a Voice over Internet Protocol (VoIP) network) can flow through several components and/or be anchored at multiple points. At some of these components and/or points (e.g., line side), communications through IP based voice networks may be susceptible to failure in the presence of, for example, a power outage.

If communications through an IP based voice network fail, participant(s) (e.g., customers and/or service representatives, among other participants) of the communication may be made aware of the failure itself (e.g., via a busy tone), but may be given no context of the failure. For example, if a customer is speaking to a service representative and the communication fails, the customer may need to call the service representative back. Information (e.g., the customer's financial information, etc.) that was exchanged prior to the failure may be lost and the communication may need to be restarted.

To prevent communication failure due to a power outage, uninterruptible power supply (UPS) battery backup systems, for example, may be implemented on telephone handsets and/or VoIP-computing devices. However, these systems may be associated with high monetary costs.

Customers and/or service representatives may experience enhanced inconvenience if they were nearing completion of a detailed communication involving a transfer of information when the communication failed. Additionally, a customer may not be able to afford the time necessary to conduct the entire communication for a second time and may abandon the communication. Such inconvenience may be costly, not only to the participants of the communication, but also, for example, to their respective employers, among others.

DETAILED DESCRIPTION

Figure 1:
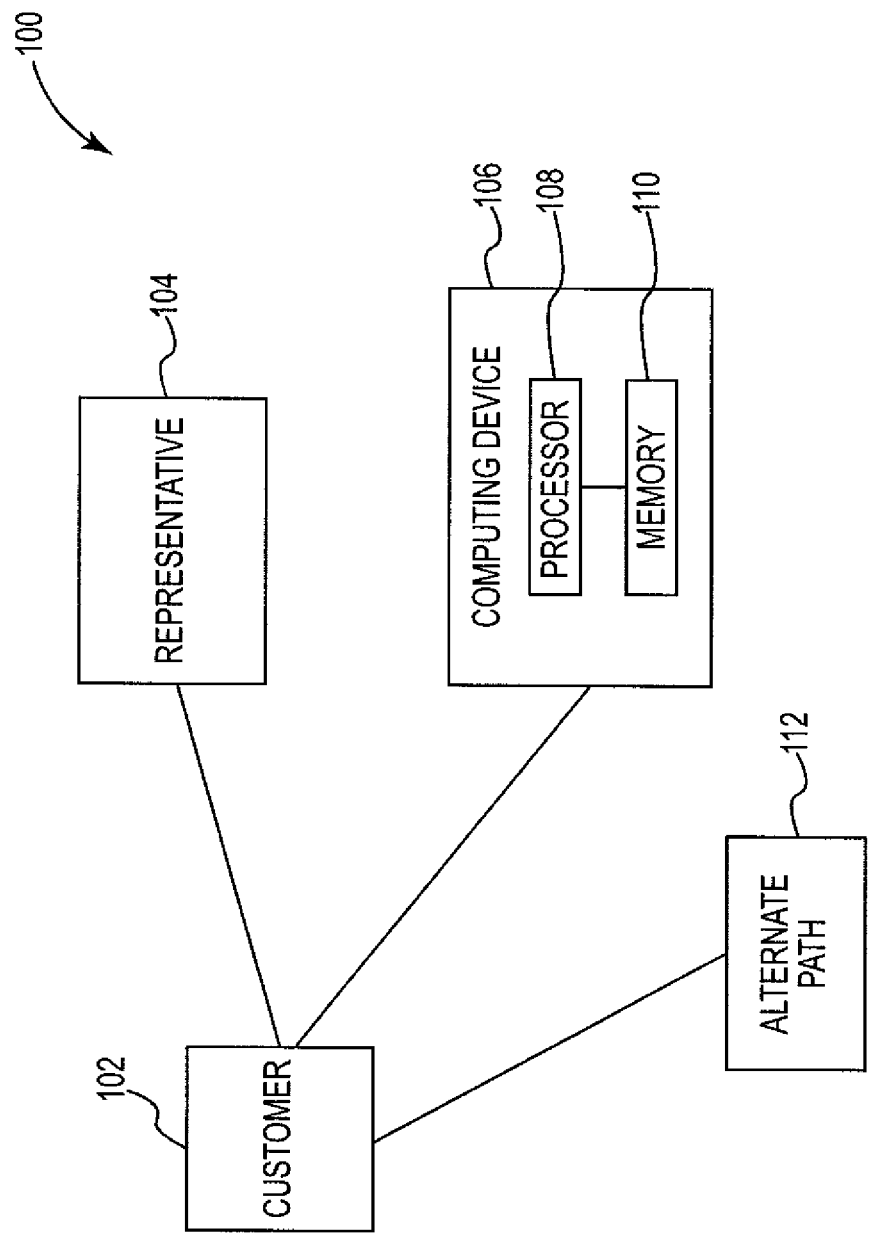
FIG. 1 illustrates a system for conducting communications in accordance with one or more embodiments of the present disclosure.

The present disclosure relates to methods, systems, and computer-readable media for conducting communications. One or more method embodiments include determining a context associated with a communication between a first participant and a second participant while the communication is occurring, determining a failure of the communication, and resuming the communication based, at least in part, on the context.

Methods, systems, and computer-readable media in accordance with one or more embodiments of the present disclosure can warn (e.g., proactively notify) a customer (e.g., a participant of the communication) of a failure of the communication and can present a number of options to the customer regarding how and/or whether the customer may desire to complete the communication. Additionally, one or more embodiments of the present disclosure can determine a context of the communication. The context of the communication can be used, for example, to complete the communication between the customer and the service representative without the need to restart the communication from the beginning. Additionally and/or alternatively, the context of the communication can be communicated to an additional service representative who can become a participant of the communication and can take part in completing the communication. Further, one or more embodiments of the present disclosure can reduce and/or eliminate costs associated with installation and maintenance of alternative backup power supplies (e.g., UPS battery backup systems).

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure. The figures herein follow a numbering convention in which the first digit or digits correspond to the drawing figure number and the remaining digits identify an element or component in the drawing.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of computing devices" can refer to one or more computing devices.

FIG. 1 illustrates a system 100 for conducting communications in accordance with one or more embodiments of the present disclosure. As shown in FIG. 1, system 100 includes a customer 102, a representative 104 (e.g., a customer service representative), and a computing device 106. As shown in FIG. 1, customer 102, representative 104 and computing device 106 can each independently communicate with each other through one or more communication channels. Communication channels can include, for example, wired and/or wireless networks, Internet Protocol (IP) networks (e.g., Voice over Internet Protocol (VoIP) networks) and any other wired and/or wireless communication linkage that allows a communicative connection and/or the exchange of information between customer 102, representative 104 and computing device 106.

While the present disclosure discusses participants to a communication as customer 102 and representative 104, embodiments of the present disclosure are not so limited. Participants to the communication are not limited to a particular number of participants nor are they limited to a "customer" and a "representative" in a business and/or transactional environment. Participant(s) can include any individual or group capable of participating in a communication via a VoIP network (e.g., a telephone call).

Voice over Internet Protocol is the routing of voice conversations over the Internet or any other IP-based network. The voice data can flow over a general-purpose packet-switched network, rather than traditional dedicated, circuit-switched voice transmission lines. Protocols used to carry voice signals over an IP network can be Voice over IP (VoIP) protocols. VoIP traffic can be deployed on a number of different types of IP networks, including the Internet or a private IP network.

System 100 includes a computing device 106. Computing device 106 is an example of a computing environment in which one or more embodiments in accordance with the present disclosure may be implemented. Numerous other general purpose or special purpose computing environments or configurations may be used. Examples of computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computing device 106 can, for example, include a processor 108, a memory 110, and/or a display (not illustrated), among other components. Memory 110 can include computer-executable instructions. Computer-executable instructions can include a number of applications (e.g., software objects and/or program modules, among others). Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

The processor 108 executes instructions and includes that portion of computing device 106 that controls the operation of the entire device. Although not depicted in FIG. 1, the processor 108 typically includes a control unit that organizes data and program storage in memory and transfers data and other information between the various parts of computing device 106. Although computing device 106 is shown to contain only a single processor 108, the disclosed embodiment applies equally to computing devices that may have multiple processors with some or all performing different functions and/or in different ways.

The memory 110 includes instructions capable of being executed by the processor 108 to carry out the functions as described below. In another embodiment, some or all of the functions are carried out via hardware in lieu of a processor-based system.

Memory 110 can be volatile or nonvolatile memory. Memory 110 can also be removable (e.g., portable) memory, or non-removable (e.g., internal) memory. For example, memory 110 can be random access memory (RAM) (e.g., dynamic random access memory (DRAM), and/or phase change random access memory (PCRAM)), read-only memory (ROM) (e.g., electrically erasable programmable read-only memory (EEPROM), and/or compact-disk read-only memory (CD-ROM)), flash memory, a laser disk, a digital versatile disk (DVD), and/or other optical disk storage), and/or a magnetic medium such as magnetic cassettes, tapes, or disks, among other types of memory.

Further, although memory 110 is illustrated as being located in computing device 106, embodiments of the present disclosure are not so limited. For example, memory 110 can also be located internal to another computing resource, e.g., enabling computer readable instructions to be downloaded over the Internet or another wired or wireless connection.

Memory 110 can store executable instructions, such as, for example, computer readable instructions (e.g., software), for conducting a communication in accordance with one or more embodiments of the present disclosure. For example, memory 110 can store executable instructions for determining a context of a communication between a first participant and a second participant, in accordance with one or more embodiments of the present disclosure. Memory 110 can store the historical communications and/or contextual information associated with historical communications between customer 102 and representative 104.

Processor 108 can execute the executable instructions stored in memory 110 to conduct a communication in accordance with one or more embodiments of the present disclosure. For example, processor 108 can execute the executable instructions stored in memory 110 to determine a failure of the communication and communicate the failure to the first participant, in accordance with one or more embodiments of the present disclosure.

Participants in and/or of a communication can be, for example, customer 102 and/or representative 104. A communication can include, among other things, a telephone call via a VoIP network and is not limited to a particular purpose, scope, duration, location, subject matter, and/or motive. The communication can be anchored at a queuing element (e.g., a customer voice portal (CVP)).

Although not shown in the embodiment illustrated in FIG. 1, system 100 can include a Back-to-back user agent (B2BUA). Although one B2BUA is discussed, embodiments of the present disclosure are not limited to a particular number of B2BUAs. The B2BUA can divide the communication channel between customer 102 and representative 104 into a split call path. A split call path can provide two or more legs (e.g., paths, channels etc.) of communication. For example, one leg can connect (e.g., allow a communication between) customer 102 and representative 104, and another can remain dormant, anchored at a location associated with representative 104 (e.g., computing device 106) to, for example, provide failover. A dormant communication leg can provide failover (e.g., resumption of the communication) in a situation where a failure is determined (e.g., detected and/or sensed) during a communication between customer 102 and representative 104. Failover can include the dormant leg being instantiated (e.g., initiated and/or launched) as an alternate path 112 to complete the communication (e.g., complete the communication between customer 102 and representative 104, among other options discussed below).

Determining a failure of the communication can include, for example, computing and/or monitoring a packet flow rate between customer 102 and representative 104, monitoring enterprise local area network (LAN) elements, and/or individual streams within a contact center, among others. For example, computing device 106 can detect that an uninterruptible power supply (UPS) to which it is connected may in a "power fail" mode which can indicate a failure of power resulting in a failure of the communication.

For example, it is estimated that customers exhibit a behavioral threshold for silence during a communication (e.g., a phone call). A customer may terminate a communication (e.g., hang up) after a threshold duration of a failure of the communication (e.g., four to five seconds of silence). Embodiments in accordance with the present disclosure can instantiate the dormant path of the communication (e.g., alternate path 112) before the threshold for silence is exceeded.

Accordingly, customer 102 can be notified of a failure of the communication based on the context of the communication before customer 102 terminates the communication.

Alternate path 112 is not limited to a particular path; rather alternate path 112 can be, include, and/or be a part of a number of paths. Subsequent to a determination of a failure of the communication, computing device 106 can determine alternate path 112 based on a number of factors including, for example, a context of the communication, and an availability of a number of options, among other factors.

For example, computing device 106 can determine a context of the communication based on an elapsed duration of the communication. For example, if customer 102 and representative 104 have been participating in the communication for thirty minutes, computing device 106 can determine that the communication is detailed in nature and a failure would come at a great inconvenience to customer 102. Further, computing device 106 can determine that customer 102 and representative 104 may have built a working relationship and/or understanding, and thus customer 102 may prefer to complete the communication with representative 104 rather than an alternate representative (discussed below). Embodiments of the present disclosure do not limit the determination of the elapsed duration of the communication to a specific method; rather, any means and/or method used to determine (e.g., measure, track, etc.) an elapsed duration of a communication can be used.

Further, computing device 106 can determine a context of the communication based on data and/or information associated with a transaction between customer 102 and representative 104. Communications can involve the transfer and/or exchange of information (e.g., information associated with a transaction). Further, information may be input into a computing device (e.g., computing device 106) by representative 104 and/or by customer 102. For example, customer 102 can communicate information to representative 104 and representative 104 can record the information into a computing device.

For example, customer 102 may have called representative 104 seeking to transfer funds from one or more accounts associated with customer 102 to other account(s) associated with customer 102. During the communication, representative 104 may have input information associated with the transfer (e.g., account numbers, amounts to be transferred, etc.) into a computing device (e.g., computing device 106). Computing device 106 can determine a context of the communication based, for example, on an amount and/or type of information exchanged (e.g., exchanged and input). For example, computing device 106 can determine that the transaction between customer 102 and representative 104 was nearly completed and/or that a number of information items remain to be exchanged to complete the communication.

Additionally, computing device can determine a context of the communication based on information associated with representative 104. Information associated with representative 104 can include, for example, an identity, a business unit, a call center, a location, hours of availability, etc. Further, representative 104 may have a designated specialty and/or area of expertise. Embodiments of the present disclosure do not limit contextual information associated with representative 104 to a particular scope. Any, information associated with representative 104 that can have a tendency to give context to a communication involving representative 104 can be used by computing device 106. For example, computing device 106 can determine that a communication was associated with a particular subject (e.g., personal funds) based on an identity, location, and/or business unit of representative 104, among other contextual information. A determined subject matter of the communication may be used, for example, in determining alternate path 112, as discussed below.

Further, computing device 106 can determine a context of the communication based on information associated with customer 102. Information associated with customer 102 can include, for example, an identity, a location, hours of availability, etc. Additionally, information associated with customer 102 can include the means and/or mode of communication used by customer 102. For example, if customer 102 is calling on a pay phone, representative 104 may not be able to call customer 102 back in the event of a failure of the communication. Further, customer 102 may be experiencing a catastrophe and participating in the communication to, for example, receive an emergency transfer of funds to a particular account. Computing device 106 can, for example, determine that the communication would likely be brief in duration compared with historical communication(s) between customer 102 and representative 104.

Additionally, computing device 102 can determine a context of the communication based on inputs received (e.g., inputs received from customer 102). For example, if customer 102 calls representative 104, an automated system can prompt customer 102 to answer a number of questions. Questions prompted to customer 102 in accordance with embodiments of the present disclosure are not limited to a particular scope and/or type, and can be used to determine, for example, whether the customer is in a hurry and/or a type of transaction customer 102 intends to perform. Embodiments of the present disclosure do not limit the prompting of customer 102 for inputs as answers to questions, nor do they limit the timing of receiving inputs from customer 102. Computing device 106 can determine that any input made during the communication having a bearing on a context of the communication may be used to determine context.

In addition to using a determined context and other considerations to determine alternate path 112, computing device 106 can determine alternate path 112 based on an availability of a number of paths such as, for example, an availability of additional representative(s) and/or an availability of additional locations. For example, alternate path 112 can be a reconnection to representative 104. Reconnection may occur if the failure is brief in duration (e.g., less than four seconds of communication failure). Further, computing device 106 may not notify customer 102 of the failure in the event that the failure does not exceed a threshold (e.g., a communication failure of a particular duration).

Additionally, computing device 106 can communicate a predicted wait time to customer 102. A predicted wait time can include a wait time to be reconnected to representative 104 and/or a predicted wait time to be transferred to another representative (e.g., a second and/or third representative, among other possible representatives).

Further, computing device 102 can determine alternate path 112 based on an availability and/or determined likelihood of transferring contextual information associated with the communication. For example, VoIP-enabled communication can allow the embedding of a session identifier in a communication signal. Representative 104 can associate the communication and/or inputs made into a computing device during the communication with the session identifier. If a failure of the communication occurs that bars representative 104 from completing the communication (e.g., due to a power outage, discussed below), the session identifier can be communicated to, and/or retrieved by, a second representative (e.g., by a second representative using computing device 106) and can be used by the second representative to retrieve information exchanged during the communication between customer 102 and representative 104 (e.g., inputs made by representative 104 during the communication). Before a transfer of the communication, computing device 106 can determine whether the session identifier is transferable and/or whether a second representative is available (e.g., able) to receive the session identifier.

Alternate path 112 can include a notification (e.g., a communication) by computing device 106 to customer 102 that a failure has occurred. The notification can, for example, inform customer 102 of the failure. Additionally and/or alternatively, the notification can include communication of a number of options and/or questions to customer 102. Options and/or questions can be determined by computing device 106 based, for example, on the context of the communication previously discussed. For example, if customer 102 had previously indicated that customer 102 would only be available for a particular period of time (e.g., 15 minutes), computing device 106 can inform customer 102 of the failure and prompt customer 102 with a query to determine if customer 102 can complete the communication at a later time (e.g., the next business day).

Customer 102 can select one or more of the communicated options by, for example, input(s) on a phone keypad and/or through an interactive voice response (IVR) application. For example, customer 102 can indicate a "yes" answer to a communicated option by pressing "1" on a phone keypad and/or by speaking the word "yes" into a phone receiver. To apprise customer 102 of the manner in which to respond, computing device 106 can communicate a manner in which customer 102 can select one or more options. Embodiments of the present disclosure do not require such notification and can accordingly allow for selection by a combination of methods and/or means available to customer 102. Additionally, embodiments of the present disclosure do not limit customer 102 to binary (e.g., "yes" or "no") selection; rather, computing device 106 can receive and process different and/or complex selections via, for example, IVR voice recognition. For example, customer 102 can speak "account information" into a phone receiver and computing device 106 can subsequently recognize and process that input.

Subsequent to receiving an input from customer 102 (e.g., an answer to a question and/or a selection of an option, among other inputs), computing device 106 can determine a number of additional questions and/or options to communicate to customer 102. The inputs made by customer 102 subsequent to additional questions and/or options can be used by computing device 106 to determine a context of the communication, as previously discussed, and/or to determine additional path 112. Continuing in the example, customer 102 can indicate that customer 102 is calling from a pay phone and cannot receive inbound calls. Additionally, customer 102 can indicate that customer 102 is calling from a cellular phone that is losing battery power and would prefer to complete the communication at a later time. Further, customer 102 can indicate that customer 102 is experiencing a catastrophe and needs to complete the communication as soon as possible.

Additional path 112 can include a notification to customer 102 that customer 102 is requested to call representative 104 back. Additionally, customer 102 can indicate (e.g., by the manners discussed above) that customer 102 desires to complete the communication by calling representative 104 back. Further, additional path 112 can include receiving call information (e.g., name and/or phone number) from customer 102 such that representative 104 can call customer 102 back to complete the communication.

Additionally and/or alternatively, customer 102 can elect to attempt to complete the communication with another representative. A second representative can be at a same location as representative 104 (e.g., a geographic location within a particular distance from customer 102) or can be at a different location (e.g., a geographic location outside a particular distance from customer 102). Computing device 106 can determine the second representative from all available representatives by, for example, determining the availability of representatives, as previously discussed. For example, computing device 106 may determine a preference for a second representative at the same location (e.g., call center) as representative 104, but may ultimately select a representative at a different location because, for example, the failure of the communication was caused by a power outage affecting the entire call center employing representative 104. Computing device 106 can communicate information associated with the failure of the communication to other representative(s).

Further, as previously discussed, a determined subject matter of the communication between customer 102 and representative 104 can be used to determine alternate path 112. For example, if a communication was associated with a particular subject matter (e.g., personal funds, among other subjects), computing device 106 can determine that the second representative should be familiar with that particular subject matter.

Additional path 112 can include customer 102 completing the communication using other forms and/or modes of communication (e.g., a mode of communication different than the mode used before the failure). For example, customer 102 may elect to complete the communication through a computer via a website. As an additional example, if the communication was being carried out via a video conference (e.g., a video chat application) and the failure was associated with the video software, customer 102 can elect to complete the communication without the added video element (e.g., via a landline phone).

Figure 2:
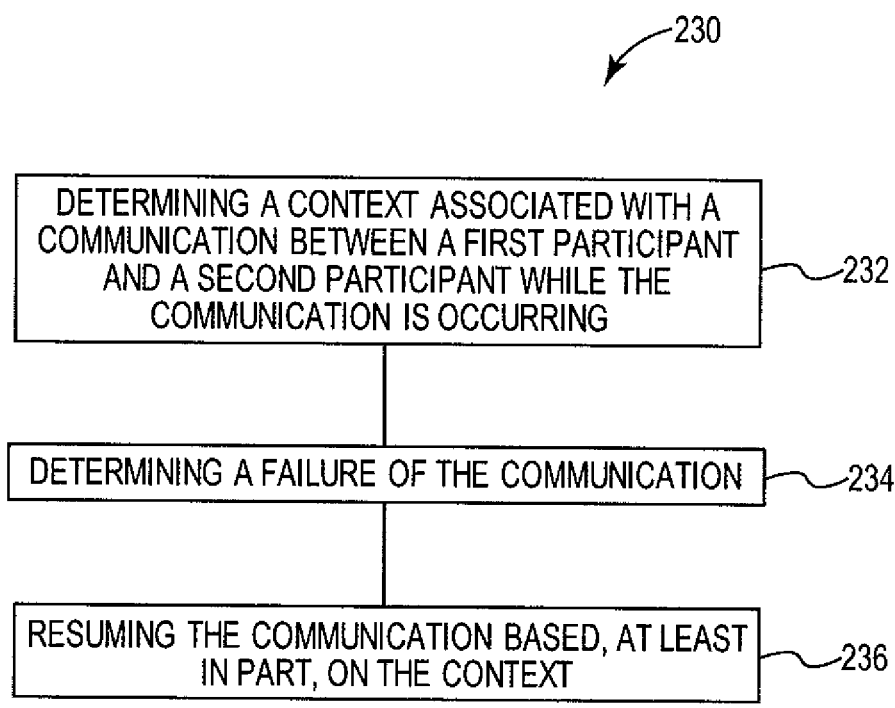
FIG. 2 illustrates a method for conducting communications in accordance with one or more embodiments of the present disclosure.

FIG. 2 illustrates a method 230 for conducting communications in accordance with one or more embodiments of the present disclosure. Method 220 can be performed, for example, by computing device 106 previously discussed in connection with FIG. 1.

At block 232, method 230 includes determining a context associated with a communication between a first participant and a second participant while the communication is occurring. Determining a context of the communication can include determinations previously discussed in connection with FIG. 1, such as, for example, determining a duration of the communication, data associated with participant(s) of the communication (e.g., a customer and/or a representative), and/or information exchanged between participants, among other contextual determinations.

At block 234, method 230 includes determining a failure of the communication. Determining a failure of the communication can include, for example, computing and/or monitoring a packet flow rate between participants of the communication, monitoring local area network (LAN) elements, and/or individual streams within a contact center, as previously discussed, among others.

At block 236, method 230 includes resuming the communication based, at least in part, on the context. Resuming the communication can include, for example, activating a dormant communication path of the VoIP network, reconnecting a participant, and/or transferring the call to another participant, among other ways of resuming the communication previously discussed in connection with FIG. 1.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method for conducting a communication, comprising:
    determining a context associated with a communication between a first participant and a second participant while the communication is occurring via a communication network, the second participant being located at a call center;
    determining an occurrence of a power failure at the call center that results in a failure of the communication;
    determining that a duration of the failure of the communication will exceed a threshold;
    in response to determining that the duration of the failure of the communication will exceed the threshold, instantiating a dormant path of the communication before the duration of the failure reaches the threshold and sending a notification of the failure of the communication to the first participant before the duration of the failure reaches the threshold;
    providing one or more options to the first participant to resume the communication, the one or more options being provided at least partially based on a resource availability inside the communication network and a resource availability outside the communication network;
    receiving a selection of an option of the one or more options from the first participant; and
    resuming the communication based, at least in part, on the selection and the context.

2. The method of claim 1, wherein the communication network is a voice over internet protocol network.

3. The method of claim 1, wherein resuming the communication includes reconnecting the first participant with the second participant subsequent to the failure.

4. The method of claim 1, wherein resuming the communication includes transferring the context of the communication to a third participant subsequent to the failure.

5. The method of claim 1, wherein determining the context includes determining an elapsed duration of the communication.

6. The method of claim 1, wherein resuming the communication is based, at least in part, on an input received from the first participant subsequent to the failure.

7. The method of claim 1, wherein determining the context includes determining information associated with the first participant while the communication is occurring.

8. The method of claim 1, wherein determining the context includes determining information associated with the second participant while the communication is occurring.

9. The method of claim 8, wherein the information associated with the second participant comprises at least one of a business unit in which the second participant is assigned, a location of the second participant, the second participant's hours of availability.

10. The method of claim 9, comprising identifying, based on the information associated with the second participant, a third participant with whom to complete the communication, and wherein the one or more options for the communication comprises an option to resume the communication with the third participant.

11. The method of claim 10, wherein the third participant is assigned to the same business unit as the second participant.

12. The method of claim 1, wherein determining the context includes determining information exchanged between the first participant and the second participant before the failure of the communication.

13. The method of claim 1, wherein the context comprises data associated with a funds transfer request by the first participant.

14. The method of claim 1, wherein determining a context associated with the communication comprises determining that a transaction between the first participant and the second participant was near completion.

15. The method of claim 14, wherein determining that the transaction was near completion comprises determining a remaining number of information items to be exchanged before the transaction is completed.

16. The method of claim 1, wherein the one or more options to complete the communication comprises an option to resume the communication with the second participant at a later time.

17. The method of claim 1, wherein the one or more options to complete the communication comprises a query requesting whether the first participant will be available to complete the communication at a later time.

18. A non-transitory computer-readable medium storing a set of instructions for conducting a communication executable by a computer to cause the computer to:
    determine a context associated with a communication between a first participant and a second participant while the communication is occurring via a communication network, the second participant being located at a call center;
    determine an occurrence of a power failure at the call center that results in a failure of the communication;
    determine that a duration of the failure of the communication will exceed a threshold;
    in response to determining that the duration of the failure of the communication will exceed the threshold, instantiate a dormant path of the communication before the duration of the failure reaches the threshold and send a notification of the failure of the communication to the first participant before the duration of the failure reaches the threshold;

provide one or more options to the first participant to resume the communication, the one or more options being provided at least partially based on a resource availability inside the communication network and a resource availability outside the communication network;

receive a selection of an option of the one or more options from the first participant; and resume the communication based, at least in part, on the selection and the context.

19. The computer-readable medium of claim 18, wherein the communication network is a voice over internet protocol network.

20. The computer-readable medium of claim 18, wherein resuming the communication includes reconnecting the first participant with the second participant subsequent to the failure.

21. The computer-readable medium of claim 18, wherein resuming the communication includes transferring the context of the communication to a third participant subsequent to the failure.

22. The computer-readable medium of claim 18, wherein determining the context includes determining an elapsed duration of the communication.

23. The computer-readable medium of claim 18, wherein resuming the communication is based, at least in part, on an input received from the first participant subsequent to the failure.

24. The computer-readable medium of claim 18, wherein determining the context includes determining information associated with the first participant while the communication is occurring.

25. The computer-readable medium of claim 18, wherein determining the context includes determining information associated with the second participant while the communication is occurring.

26. The computer-readable medium of claim 18, wherein determining the context includes determining information exchanged between the first participant and the second participant before the failure of the communication.

27. A system for conducting a communication, comprising:

a computing device including:

a memory; and a processor configured to execute executable instructions stored in the memory to:

determine a context associated with a communication between a first participant and a second participant while the communication is occurring via a communication network, the second participant being located at a call center;

determine an occurrence of a power failure at the call center that results in a failure of the communication;

determine that a duration of the failure of the communication will exceed a threshold;

in response to determining that the duration of the failure of the communication will exceed the threshold, instantiate a dormant path of the communication before the duration of the failure reaches the threshold and send a notification of the failure of the communication to the first participant before the duration of the failure reaches the threshold;

provide one or more options to the first participant to resume the communication, the one or more options being provided at least partially based on a resource availability inside the communication network and a resource availability outside the communication network;

receive a selection of an option of the one or more options from the first participant; and resume the communication based, at least in part, on the selection and the context.

28. The system of claim 27, wherein the communication network is a voice over internet protocol network.

29. The system of claim 27, wherein resuming the communication includes reconnecting the first participant with the second participant subsequent to the failure.

30. The system of claim 27, wherein resuming the communication includes transferring the context of the communication to a third participant subsequent to the failure.

31. The system of claim 27, wherein determining the context includes determining an elapsed duration of the communication.

32. The system of claim 27, wherein resuming the communication is based, at least in part, on an input received from the first participant subsequent to the failure.

33. The system of claim 27, wherein determining the context includes determining information associated with the first participant while the communication is occurring.

34. The system of claim 27, wherein determining the context includes determining information associated with the second participant while the communication is occurring.

35. The system of claim 27, wherein determining the context includes determining information exchanged between the first participant and the second participant before the failure of the communication.

* * * * *